United States Patent
Kamei (10) Patent No.: US 7,940,469 B2
(45) Date of Patent: May 10, 2011

(54) ANAMORPHIC OPTICAL SYSTEM, IMAGE PICKUP DEVICE, ON-BOARD TYPE CAMERA AND MONITORING CAMERA

(75) Inventor: Yuji Kamei, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/586,370

(22) Filed: Sep. 21, 2009

(65) Prior Publication Data

US 2010/0079874 A1    Apr. 1, 2010

(30) Foreign Application Priority Data

Oct. 1, 2008  (JP) ................. 2008-256477

(51) Int. Cl.
*G02B 13/08* (2006.01)
(52) U.S. Cl. ........................ 359/668; 359/671
(58) Field of Classification Search .......... 359/668, 359/670, 671
See application file for complete search history.

(56) References Cited

U.S. PATENT DOCUMENTS

| 3,658,410 A | 4/1972 | Willey | |
| 5,731,908 A | 3/1998 | Kim | 359/668 |
| 6,865,028 B2 | 3/2005 | Moustier et al. | |
| 7,605,856 B2 | 10/2009 | Imoto | |
| 7,697,055 B2 | 4/2010 | Imoto et al. | |
| 2004/0169726 A1 | 9/2004 | Moustier et al. | 348/207.1 |
| 2007/0133107 A1 | 6/2007 | Ohzawa et al. | 359/749 |
| 2010/0060992 A1 | 3/2010 | Hirose | |

FOREIGN PATENT DOCUMENTS

| JP | 8-62494 | 3/1996 |
| JP | 2005-110202 | 4/2005 |
| JP | 2006-011093 | 1/2006 |
| JP | 2007-163549 | 6/2007 |
| JP | 2007-328030 | 12/2007 |
| WO | 2008/062661 A1 | 5/2008 |

OTHER PUBLICATIONS

The European communication dated Jan. 29, 2010.
Japanese communication dated Aug. 24, 2010 in corresponding foreign application (JP2008-256477).

*Primary Examiner* — Alicia M Harrington
(74) *Attorney, Agent, or Firm* — Nields, Lemack & Frame, LLC (57) ABSTRACT

The present invention provides an anamorphic optical system 1, comprising one aspheric surface lens G5 and one anamorphic lens G3 on object side, and one aspheric lens G7 and one anamorphic lens G8 on image side with a diaphragm S11 therebetween, and an effective field angle is set to 200° or more at maximum in horizontal direction.

4 Claims, 13 Drawing Sheets

| | | ANAMORPHIC MAGNIFICATION | | | | | | | | | | |
|---|---|---|---|---|---|---|---|---|---|---|---|---|
| | | 1 | 1.1 | 1.2 | 1.3 | 1.4 | 1.5 | 1.6 | 1.7 | 1.8 | 1.9 | 2 |
| FOCAL DISTANCE (mm) | G3 IN HORIZONTAL DIRECTION | -5.49 | -5.49 | -5.49 | -5.49 | -5.49 | -5.49 | -5.49 | -5.49 | -5.49 | -5.49 | -5.49 |
| | G3 IN VERTICAL DIRECTION | -5.49 | -7.01 | -8.16 | -9.53 | -10.94 | -12.44 | -12.61 | -14.07 | -14.51 | -17.01 | -19.31 |
| | G8 IN HORIZONTAL DIRECTION | 4.37 | 4.37 | 4.37 | 4.37 | 4.37 | 4.37 | 4.37 | 4.37 | 4.37 | 4.37 | 4.37 |
| | G8 IN VERTICAL DIRECTION | 4.37 | 4.47 | 4.78 | 5.17 | 5.84 | 7.76 | 8.04 | 9.45 | 11.91 | 14.46 | 18.43 |

| SURFACE NUMBER | RADIUS OF CURVATURE IN HORIZONTAL DIRECTION | RADIUS OF CURVATURE IN VERTICAL DIRECTION | DISTANCE BETWEEN SURFACES | REFRACTIVE INDEX (nd) | ABBE NUMBER ($\nu d$) |
|---|---|---|---|---|---|
| S1 | 12.0284 | 12.0284 | 0.90 | 1.835 | 42.714 |
| S2 | 4.8000 | 4.8000 | 2.14 | | |
| S3 | 12.9229 | 12.9229 | 0.90 | 1.835 | 42.714 |
| S4 | 2.7000 | 2.7000 | 2.27 | | |
| S5 | −5.1326 | −47.5864 | 0.90 | 1.531 | 56.044 |
| S6 | 7.1795 | 8.6343 | 0.60 | | |
| S7 | 82.2795 | 82.2795 | 1.57 | 1.847 | 23.778 |
| S8 | −4.4734 | −4.4734 | 1.50 | | |
| S9 | 18.3502 | 18.3502 | 1.45 | 1.531 | 56.044 |
| S10 | −3.4638 | −3.4638 | 0.37 | | |
| S11 (DIAPHRAGM) | | | 0.27 | | |
| S12 | −4.5335 | −4.5335 | 0.90 | 1.847 | 23.778 |
| S13 | 4.9171 | 4.9171 | 0.12 | | |
| S14 | 3.9383 | 3.9383 | 1.97 | 1.531 | 56.044 |
| S15 | −3.0865 | −3.0865 | 0.23 | | |
| S16 | 17.4055 | 11.0884 | 2.24 | 1.531 | 56.044 |
| S17 | −2.5627 | −12.1022 | 1.00 | | |
| S18 | ∞ | ∞ | 0.75 | 1.516 | 64.142 |
| S19 | ∞ | ∞ | 0.85 | | |
| IMAGE SURFACE | | | | | |

FIG. 4

| DATA OF ANAMORPHIC SURFACE OF THE FIFTH SURFACE | | | | | |
|---|---|---|---|---|---|
| KX | KY | AR | BR | CR | DR |
| 0 | 0 | −3.47E−04 | 7.81E−06 | 2.49E−06 | 7.49E−07 |
| AP | BP | CP | DP | | |
| 0.00E+00 | 0.00E+00 | 0.00E+00 | 0.00E+00 | | |

FIG. 5

| DATA OF ANAMORPHIC SURFACE OF THE SIXTH SURFACE | | | | | |
|---|---|---|---|---|---|
| KX | KY | AR | BR | CR | DR |
| 0 | 0 | 9.60E−05 | 1.02E−05 | 1.09E−05 | −5.08E−08 |
| AP | BP | CP | DP | | |
| −1.26E+00 | 1.15E+00 | 2.62E−01 | −3.22E−01 | | |

FIG. 6

| DATA OF ANAMORPHIC SURFACE OF THE SIXTEENTH SURFACE | | | | | |
|---|---|---|---|---|---|
| KX | KY | AR | BR | CR | DR |
| 0 | 0 | −1.63E−03 | 1.19E−03 | 7.79E−04 | −3.18E−04 |
| AP | BP | CP | DP | | |
| 7.45E−01 | −2.77E−01 | 3.71E−02 | −5.36E−02 | | |

FIG. 7

| DATA OF ANAMORPHIC SURFACE OF THE SEVENTEENTH SURFACE | | | | | |
|---|---|---|---|---|---|
| KX | KY | AR | BR | CR | DR |
| −0.761925 | −26.637102 | 7.75E−03 | 1.30E−04 | 1.69E−05 | 8.87E−06 |
| AP | BP | CP | DP | | |
| −1.99E−01 | 4.45E−01 | −1.20E+00 | 3.22E−01 | | |

FIG. 8

ASPHERIC DATA OF THE NINTH SURFACE

| CONIC COEFFICIENT | SECONDARY COEFFICIENT | QUARTIC COEFFICIENT | SEXTIC COEFFICIENT | OCTIC COEFFICIENT | DECAIC COEFFICIENT |
|---|---|---|---|---|---|
| 0 | 0 | -5.60E-03 | -9.19E-03 | 4.95E-03 | -3.68E-04 |

FIG. 9

ASPHERIC DATA OF THE TENTH SURFACE

| CONIC COEFFICIENT | SECONDARY COEFFICIENT | QUARTIC COEFFICIENT | SEXTIC COEFFICIENT | OCTIC COEFFICIENT | DECAIC COEFFICIENT |
|---|---|---|---|---|---|
| -22.874275 | 0 | -5.93E-02 | 1.88E-02 | 4.23E-03 | -9.04E-04 |

FIG. 10

ASPHERIC DATA OF THE FOURTEENTH SURFACE

| CONIC COEFFICIENT | SECONDARY COEFFICIENT | QUARTIC COEFFICIENT | SEXTIC COEFFICIENT | OCTIC COEFFICIENT | DECAIC COEFFICIENT |
|---|---|---|---|---|---|
| -8.097489 | 0 | 9.95E-03 | 2.27E-03 | 2.29E-03 | -1.39E-03 |

FIG. 11

ASPHERIC DATA OF THE FIFTEENTH SURFACE

| CONIC COEFFICIENT | SECONDARY COEFFICIENT | QUARTIC COEFFICIENT | SEXTIC COEFFICIENT | OCTIC COEFFICIENT | DECAIC COEFFICIENT |
|---|---|---|---|---|---|
| -0.744019 | 0 | -8.25E-03 | 5.85E-03 | 6.81E-05 | -3.17E-04 |

PROJECTION CHARACTERISTICS IN HORIZONTAL DIRECTION

FIG. 15

PROJECTION CHARACTERISTICS IN VERTICAL DIRECTION

FIG. 16

| FOCAL DISTANCE (mm) | | ANAMORPHIC MAGNIFICATION | | | | | | | | | | |
|---|---|---|---|---|---|---|---|---|---|---|---|---|
| | | 1 | 1.1 | 1.2 | 1.3 | 1.4 | 1.5 | 1.6 | 1.7 | 1.8 | 1.9 | 2 |
| | G3 IN HORIZONTAL DIRECTION | -5.49 | -5.49 | -5.49 | -5.49 | -5.49 | -5.49 | -5.49 | -5.49 | -5.49 | -5.49 | -5.49 |
| | G3 IN VERTICAL DIRECTION | -5.49 | -7.01 | -8.16 | -9.53 | -10.94 | -12.44 | -12.61 | -14.07 | -14.51 | -17.01 | -19.31 |
| | G8 IN HORIZONTAL DIRECTION | 4.37 | 4.37 | 4.37 | 4.37 | 4.37 | 4.37 | 4.37 | 4.37 | 4.37 | 4.37 | 4.37 |
| | G8 IN VERTICAL DIRECTION | 4.37 | 4.47 | 4.78 | 5.17 | 5.84 | 7.76 | 8.04 | 9.45 | 11.91 | 14.46 | 18.43 |

FIG. 17

| (fv/fh)/M | | ANAMORPHIC MAGNIFICATION (M) | | | | | | | | | | |
|---|---|---|---|---|---|---|---|---|---|---|---|---|
| | | 1 | 1.1 | 1.2 | 1.3 | 1.4 | 1.5 | 1.6 | 1.7 | 1.8 | 1.9 | 2 |
| | G3 | 1.00 | 1.16 | 1.24 | 1.34 | 1.42 | 1.51 | 1.44 | 1.51 | 1.47 | 1.63 | 1.76 |
| | G8 | 1.00 | 0.93 | 0.91 | 0.91 | 0.95 | 1.18 | 1.15 | 1.27 | 1.51 | 1.74 | 2.11 |

FIG. 18

ANAMORPHIC OPTICAL SYSTEM, IMAGE PICKUP DEVICE, ON-BOARD TYPE CAMERA AND MONITORING CAMERA

BACKGROUND OF THE INVENTION

The present invention relates to a lens optical system of an on-board type camera (a camera carried on board of a vehicle), mounted on front and rear side or on lateral side of a moving object such as an automobile, or to a lens optical system of a monitoring camera for taking and recording images inside or outside of a vehicle while a moving object such as an automobile is being driven or is parked. The invention also relates to an image pickup device having lens optical systems of various types of cameras.

In the past, various types of image pickup devices such as an on-board type camera, a monitoring camera, etc. have been known. For instance, in the on-board type cameras disclosed in the Japanese Patent Publications JP-A-2007-163549 or JP-A-2006-11093, an effective field angle in horizontal direction is about 180°. Also, it is about 180° in the image pickup device disclosed in JP-A-2007-328030.

Also, JP-A-2007-163549 discloses a lens system with a second lens group where a plastic lens, a diaphragm, and a plastic lens are arranged with the diaphragm therebetween. In claim 6 of JP-A-2007-163549, lens design is defined on the condition: −0.5<flaf/flar<0 (where flaf and flar represent two focal distances adjacent to each other respectively with a diaphragm between them). In this type of lens design, an effective field angle cannot be attained in horizontal direction.

In JP-A-2006-11093, the conditions are set to: 0.3<|fpnx/fppx|<0.6, and 0.3<|fpny/fppy|<0.6. As a result, in JP-A-2006-11093, an effective field angle cannot be attained in horizontal direction.

Here, when it is assumed that optical axis is Z-axis and that X-axis and Y-axis perpendicularly cross the Z-axis, it is defined as follows:
fpnx: X-Z section paraxial focal distance of a negative lens made of plastic material;
fppx: X-Z section paraxial focal distance of a positive lens made of plastic material;
fpny: Y-Z section paraxial focal distance of a negative lens made of plastic material; and
fppy: Y-Z section paraxial focal distance of a positive lens made of plastic material.
As a described above, in the conventional type image pickup device, an effective field angle is about 180°, and it is not possible to attain the effective field angle to 200° or more at maximum in horizontal direction. Further, it is not possible to accomplish an anamorphic optical system with high projection characteristics and high resolving power in particular, and it is not possible to realize anamorphic magnification, which is not influenced by temperature conditions, either.

SUMMARY OF THE INVENTION

It is an object of the present invention to develop an anamorphic optical system, which has an effective field angle of 200° or more at maximum in horizontal direction and has high projection characteristics and high resolving power in particular, and also to provide this anamorphic optical system on an image pickup device such as an on-board type camera, a monitoring camera, etc., and further to provide an image pickup device, an on-board type camera, and a monitoring camera, which have an effective field of angle of 200° or more at maximum in horizontal direction.

Describing in more detail, it is an object of the present invention to provide an image pickup device comprising an optical system, which has high projection characteristics closer to stereoscopic projection, has a high resolving power in particular on outside axis, has an effective field angle of 200° or more at maximum in horizontal direction, or an effective field angle of at least about 220° at maximum and has precise anamorphic magnification. Also, it is an object of the present invention to provide an on-board type camera, which has such type of lens system as to take images inside or outside a vehicle. Also, it is an object of the present invention to provide a monitoring camera, which has such type of lens system as to take and record images inside or outside a moving object such as an automobile while the automobile is being driven or is parked.

To obtain the above objects, the present invention provides an image pickup device, which comprises one aspheric lens and one anamorphic lens on object side and one aspheric lens and one anamorphic lens on image side with a diaphragm therebetween, and is provided with an anamorphic optical system, which has an effective field angle of 200° or more at maximum in horizontal direction.

The invention also provides an on-board type camera, which comprises one aspheric lens and one anamorphic lens on object side and one aspheric lens and one anamorphic lens on image side with a diaphragm therebetween, and is provided with an anamorphic optical system, which has an effective field angle of 200° or more at maximum in horizontal direction.

Also, the invention provides a monitoring camera, which comprises one aspheric lens and one anamorphic lens on object side and one aspheric lens and one anamorphic lens on image side with a diaphragm therebetween, and is provided with an anamorphic optical system, which has an effective field angle of 200° or more at maximum in horizontal direction.

The present invention provides an anamorphic optical system, which comprises one aspheric lens and one anamorphic lens on object side and one aspheric lens and one anamorphic lens on image side with a diaphragm therebetween, and is provided with an anamorphic optical system, which has an effective field angle of 200° or more at maximum in horizontal direction. As a result, it is possible to attain an anamorphic optical system having high projection characteristics and high resolving power in particular and to realize anamorphic magnification not influenced by temperature conditions.

DETAILED DESCRIPTION ON THE PREFERRED EMBODIMENT

Description will be given below on the best aspect for carrying out the invention by referring to the attached drawings.

Figure 1:
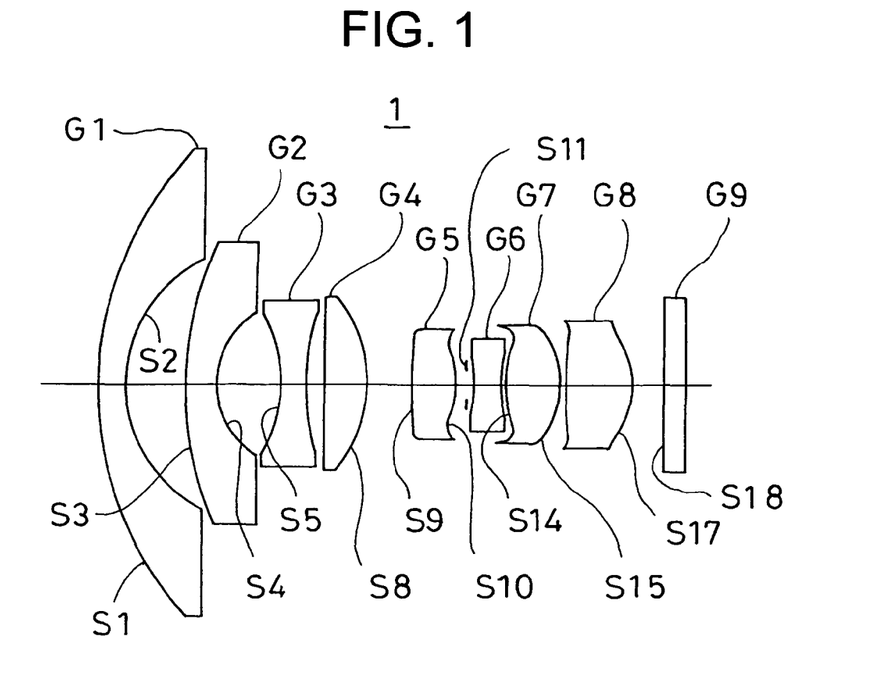
FIG. 1 is a horizontal cross-sectional view of an anamorphic optical system of an image pickup device according to the present invention.
Figure 2:
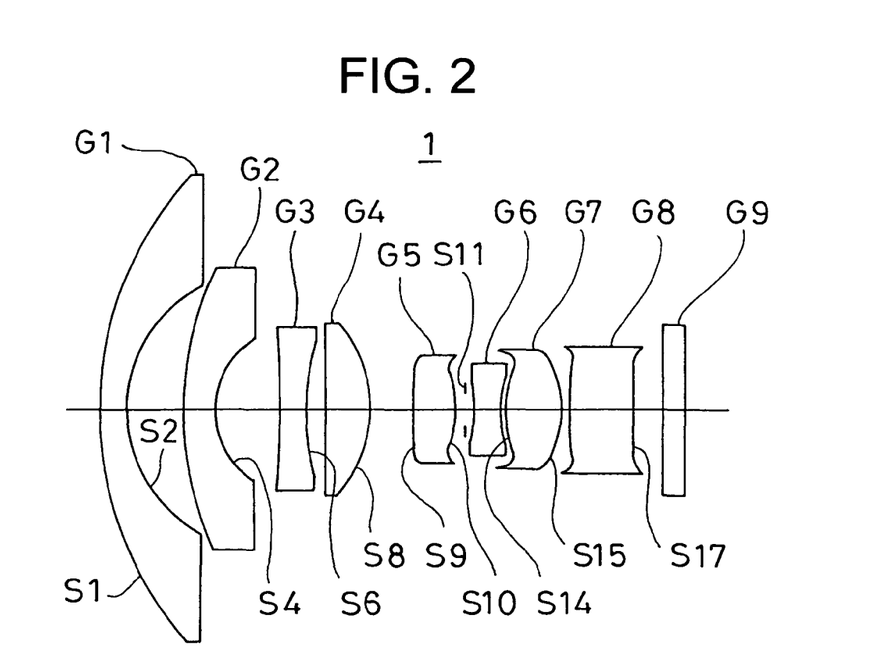
FIG. 2 is a vertical cross-sectional view of an anamorphic optical system of an image pickup device according to the present invention.

FIG. 1 and FIG. 2 represent respectively a horizontal cross-sectional view and a vertical cross-sectional view of an anamorphic optical system 1 of an image pickup device according to the present invention.

The anamorphic optical system 1 comprises 9 lenses. From a diaphragm s11 toward object side, there are arranged five lenses, i.e. a first lens G1, a second lens G2, a third lens G3, a fourth lens G4, and a fifth lens G5. From the diaphragm s11 toward image side, four lenses are arranged: a sixth lens G6, a seventh lens G7, an eighth lens G8, and a ninth lens G9.

Lens surfaces of these 9 lenses are referred from object side as s1 to s10 and s12 to s19 respectively. Some of symbols of the lens surfaces are not shown in the figure.

The first lens G1 is a lens made of glass. The third lens G3, the fifth lens G5, the seventh lens G7 and the eighth lens G8 are made of resin such as plastics. The other lenses are glass lenses. The ninth lens 9 is simply a glass plate.

The first lens G1 has a large aperture. In the fifth lens G5, each of a first surface s9 and a second surface s10 is an aspheric surface. Also, in the seventh lens G7, each of a first surface s14 and a second surface s15 is designed as an aspheric surface. Each of the third lens G3 and the eighth lens G8 is designed as an anamorphic lens.

Figure 3:
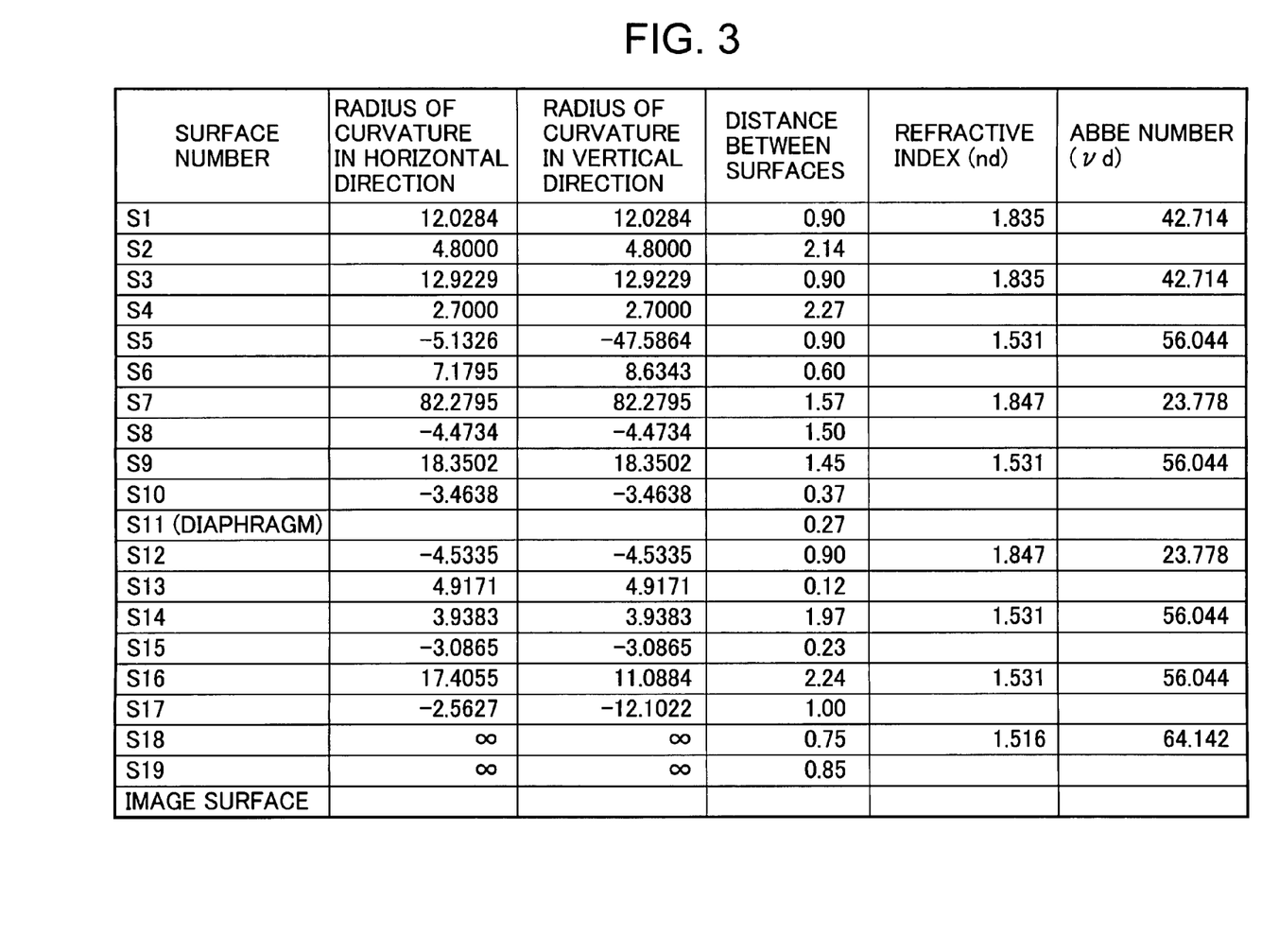
FIG. 3 is a table to show lens data of the anamorphic optical system.

FIG. 3 is a table to show lens data of an anamorphic optical system of an image pickup device according to the present invention. That is, the table shows lens data with respect to each of the lens surfaces s1 to s10, the diaphragm s11 and the lens surfaces s12 to s19 of the anamorphic optical system. And lens data are radius of curvature in each of horizontal direction and vertical direction, distance between surfaces, refractive index (nd) and Abbe number (vd).

Figure 4:
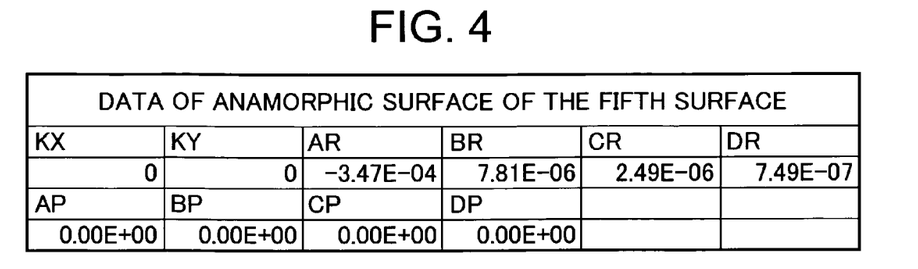
FIG. 4 is a table to show data of an anamorphic surface of a fifth surface.
Figure 5:
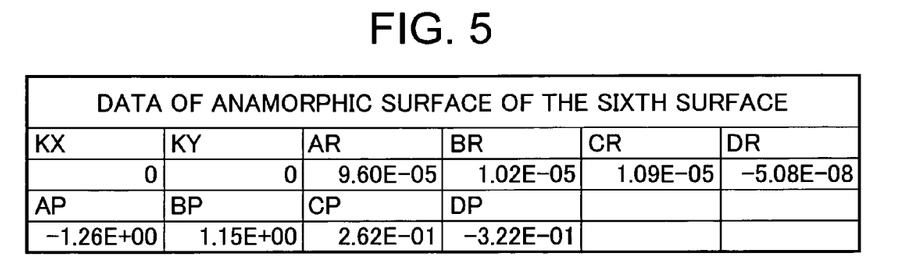
FIG. 5 is a table to show data of an anamorphic surface of a sixth surface.
Figure 6:
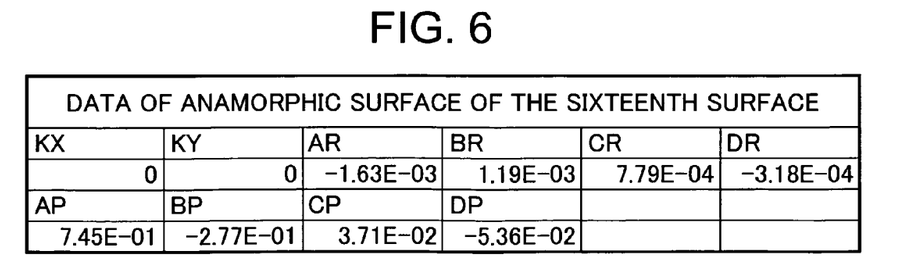
FIG. 6 is a table to show data of an anamorphic surface of a sixteenth surface.
Figure 7:
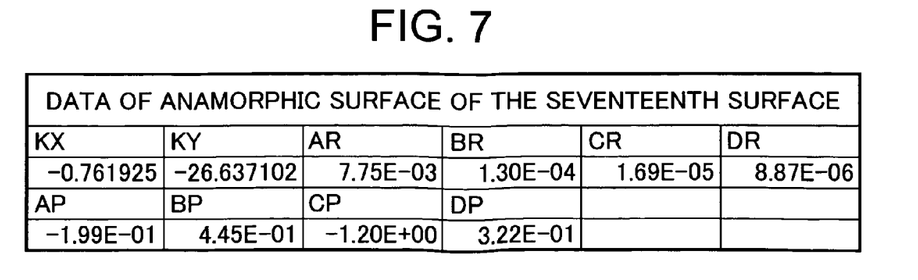
FIG. 7 is a table to show data of an anamorphic surface of a seventeenth surface.

FIG. 4 shows anamorphic surface data of the fifth surface s5, FIG. 5 shows anamorphic surface data of the sixth surface s6, FIG. 6 shows anamorphic surface data of the sixteenth surface s17, and FIG. 7 shows anamorphic surface data of the seventeenth surface s18, respectively.

Figure 8:
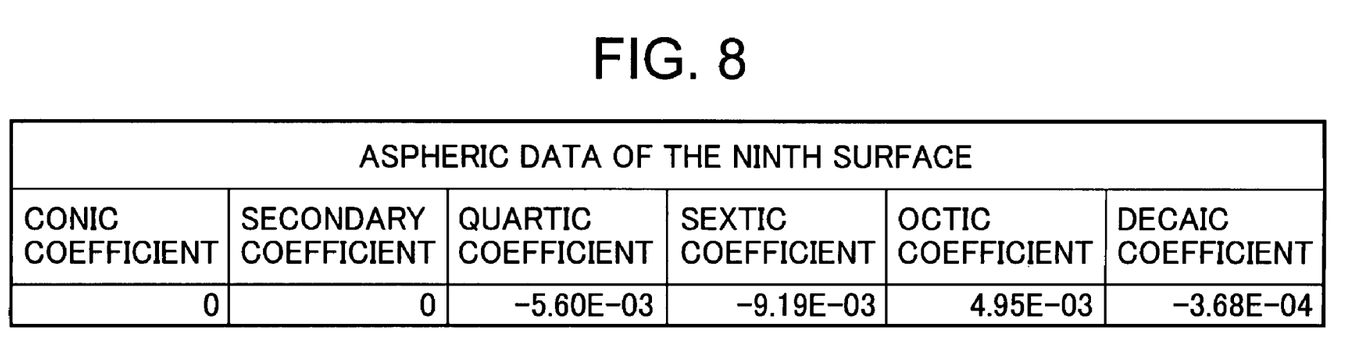
FIG. 8 is a table to show aspheric data of a ninth surface.
Figure 9:
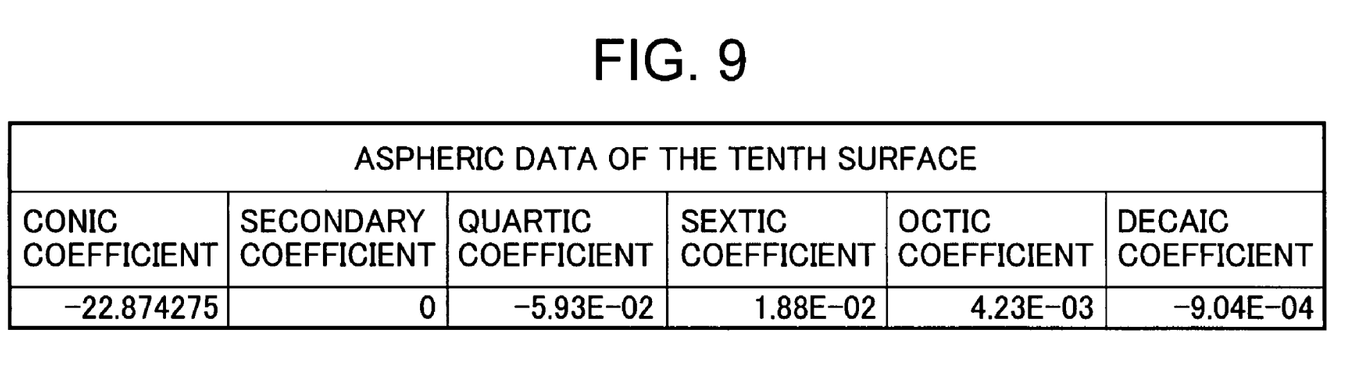
FIG. 9 is a table to show aspheric data of a tenth surface.
Figure 10:
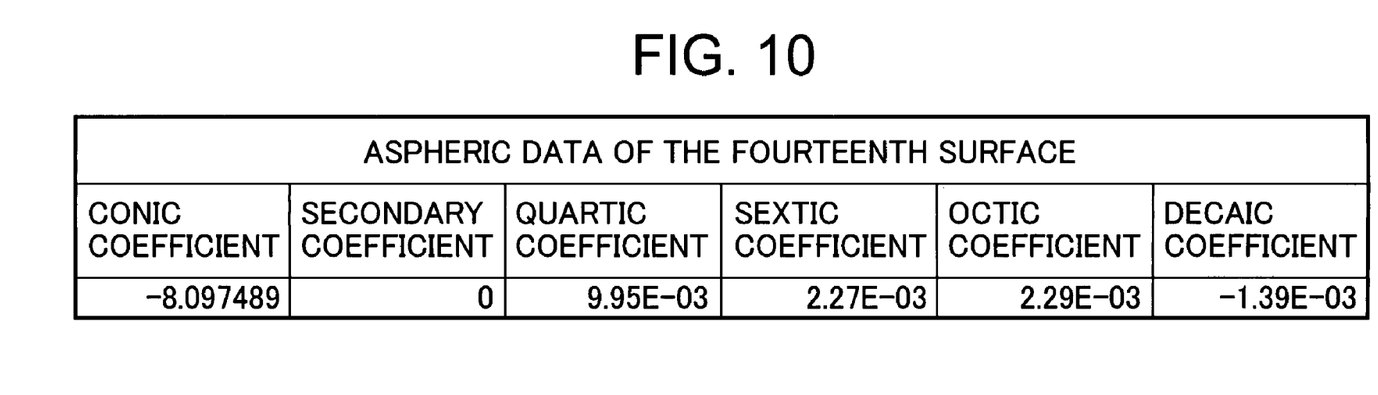
FIG. 10 is a table to show aspheric data of a fourteenth surface.
Figure 11:
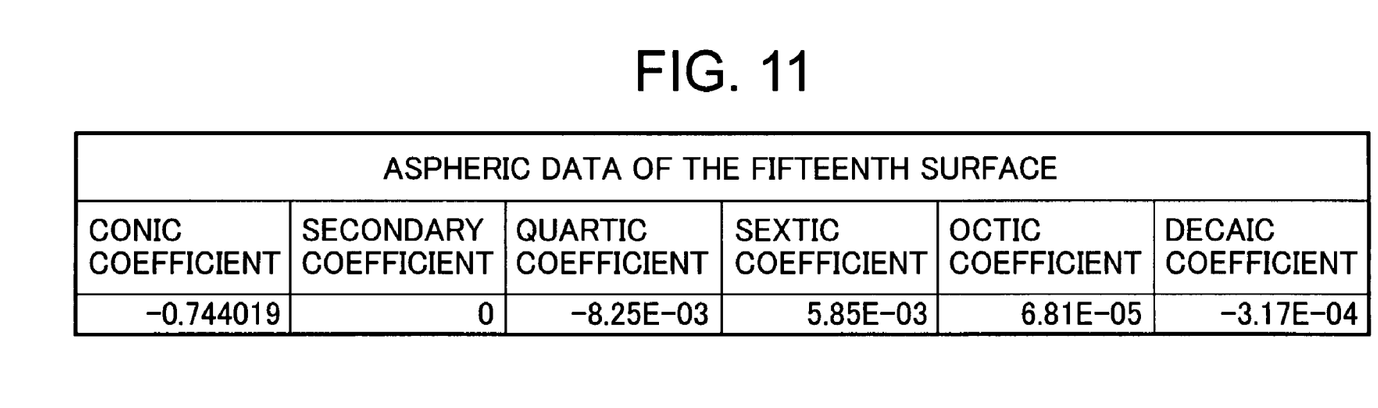
FIG. 11 is a table to show aspheric data of a fifteenth surface.

FIG. 8 shows aspheric data of the ninth surface s9, FIG. 9 shows aspheric data of the tenth surface s10, FIG. 10 shows aspheric data of the fourteenth surface s15, and FIG. 11 shows aspheric data of the fifteenth surface s16, respectively.

Figure 12:
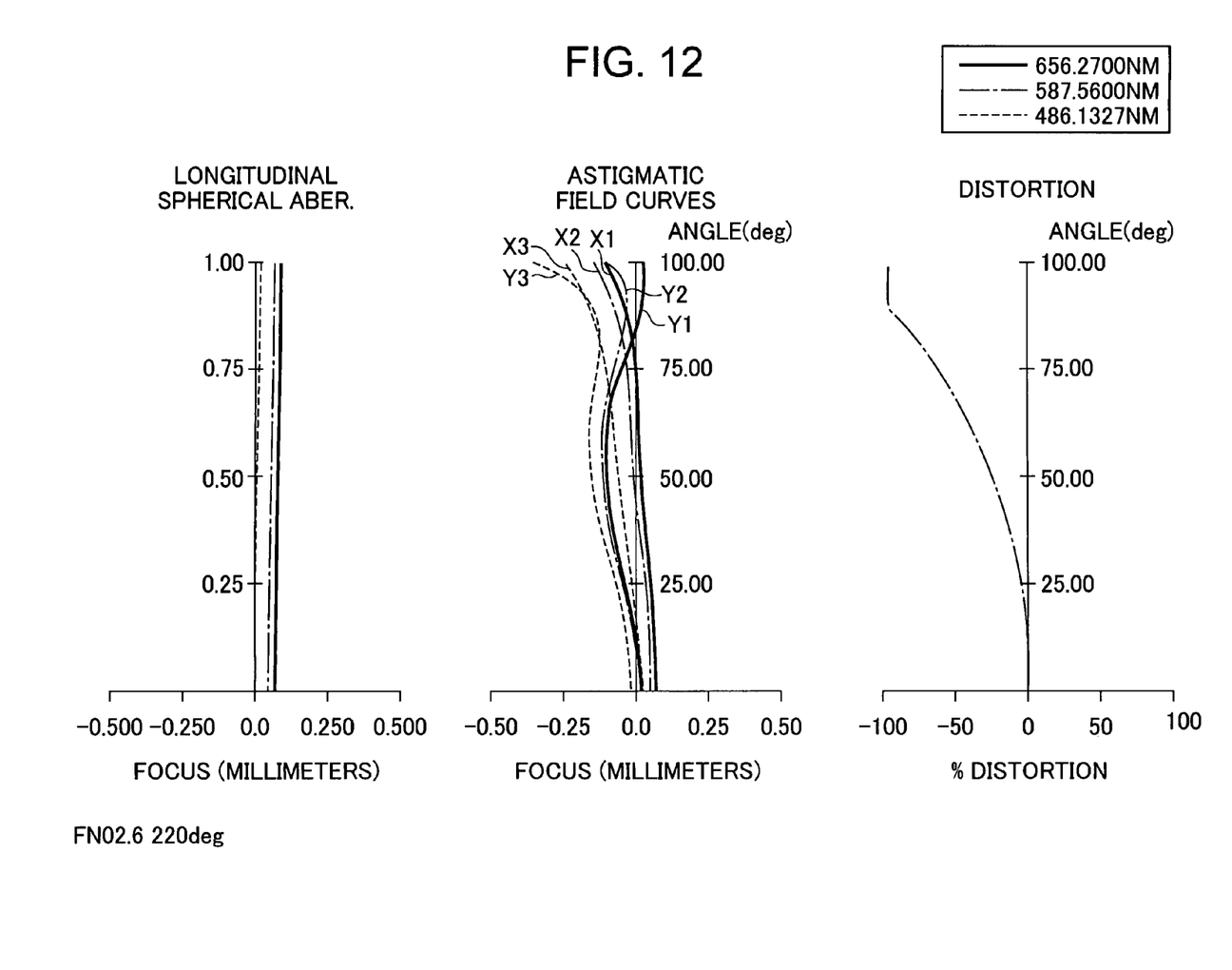
FIG. 12 are graphs to show aberration in horizontal direction of an anamorphic optical system of the present invention.
Figure 13:
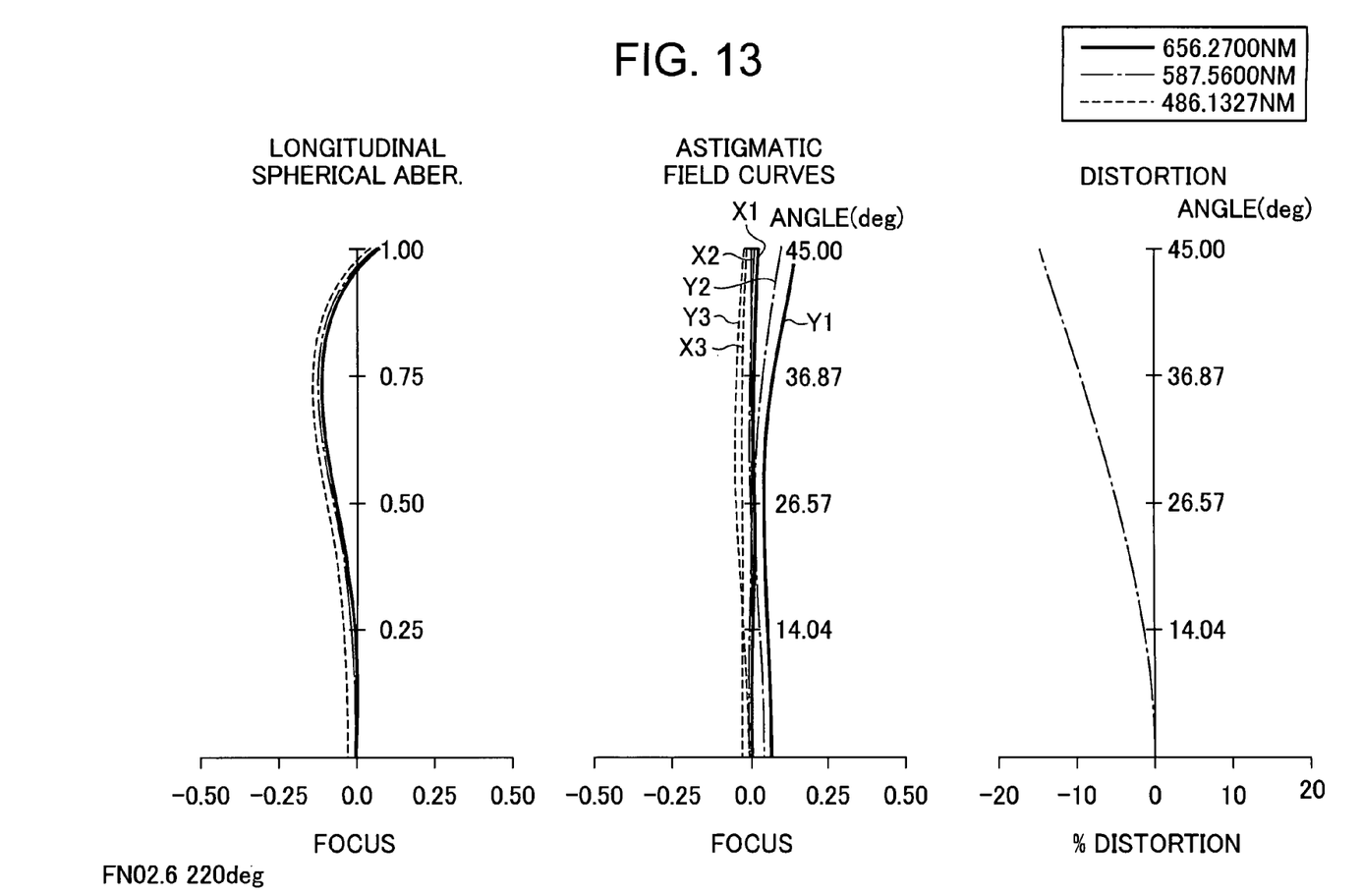
FIG. 13 are graphs to show aberration in vertical direction of an anamorphic optical system of the present invention.

FIG. 12 and FIG. 13 show graphs of aberration in horizontal direction and vertical direction of the anamorphic optical system 1 of the present invention respectively. Condition of spherical aberration, astigmatic, and distortion aberration with respect to three primary colors, i.e. red color (wavelength 656 nm), green color or yellow color (wavelength 587 nm), and blue color (wavelength 486 nm) are shown respectively.

Figure 14:
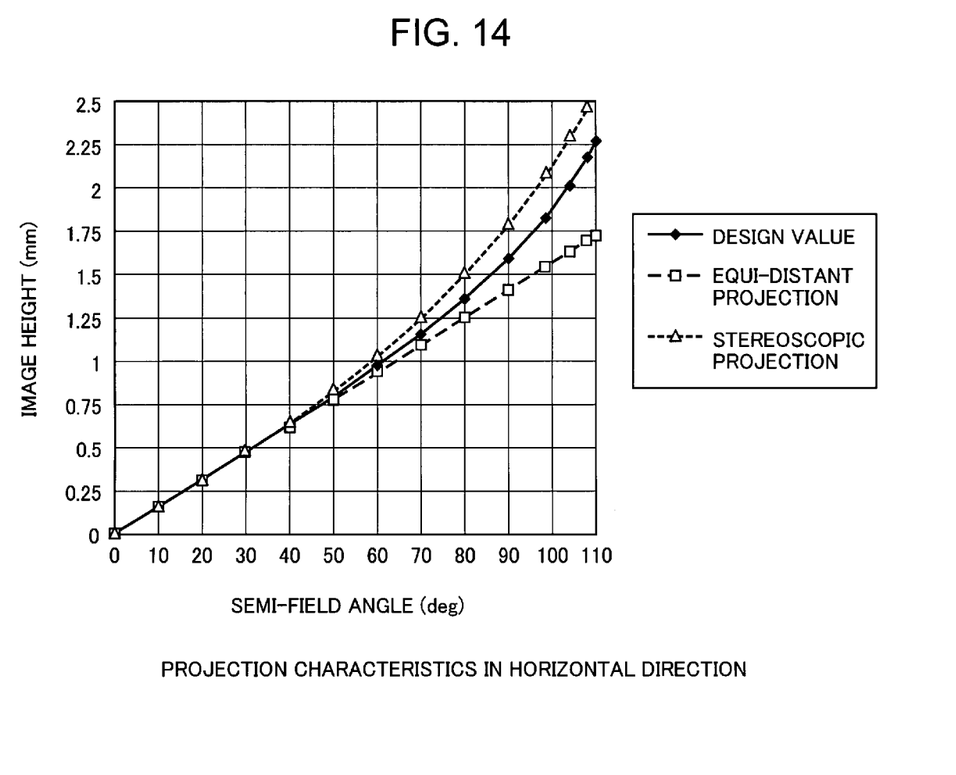
FIG. 14 is a graph to show projection characteristics in horizontal direction of the anamorphic optical system of the present invention.
Figure 15:
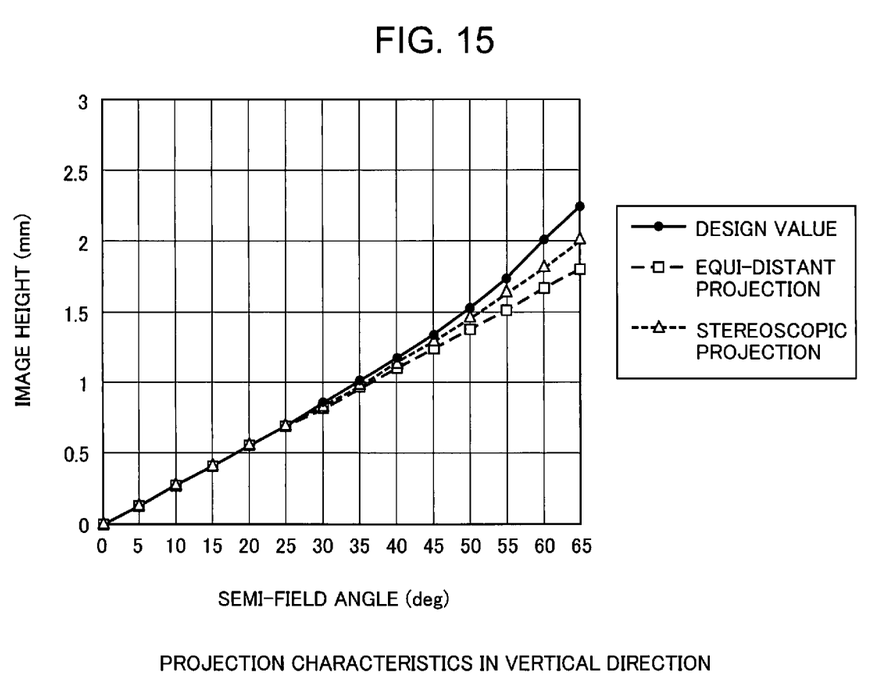
FIG. 15 is a graph to show projection characteristics in vertical direction of the anamorphic optical system of the present invention.

FIG. 14 shows projection characteristics in horizontal direction of the anamorphic optical system 1 of the present invention. FIG. 15 shows projection characteristics in vertical direction.

An equi-distant projection is shown in approximately linear (straight-line) graph both in horizontal and vertical directions, and a stereoscopic projection is also represented in approximately linear (straight-line) graph. However, in the stereoscopic projection in horizontal direction, when it goes beyond a semi-field angle 90°, an image height increases drastically and when it goes beyond a semi-field angle 110°, the image height goes beyond 2.5 mm easily and reaches nearly as high as 3.0 mm.

Figure 16:
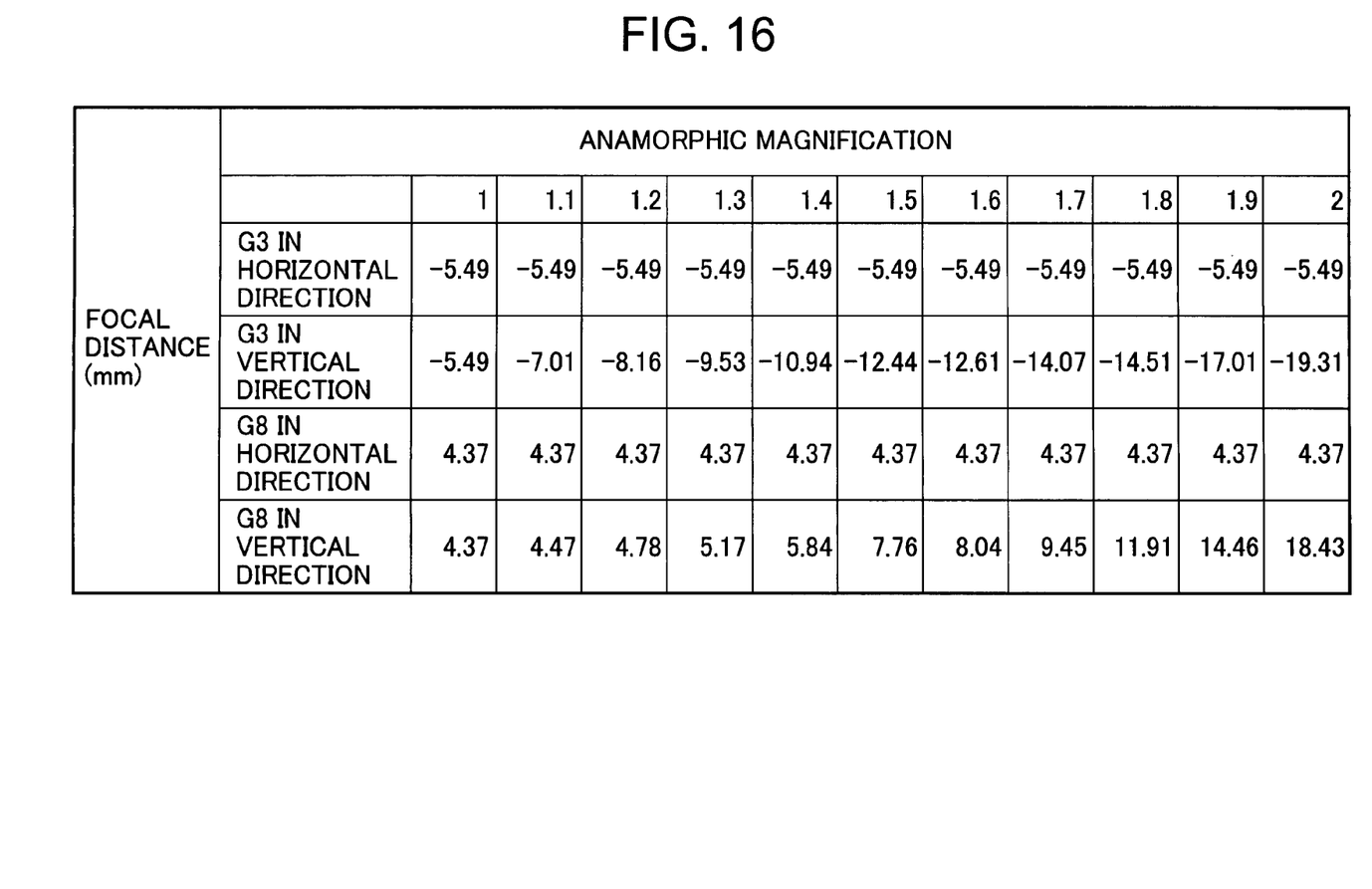
FIG. 16 is a table to show each anamorphic magnification (fh and fv) in horizontal direction and in vertical direction of a third lens G3 and an eighth lens G8.

The third lens G3 and the eighth lens G8 are anamorphic lenses, and anamorphic magnification of each lens is as shown in FIG. 16.

In the third lens G3, with the increase of anamorphic magnification in vertical direction, the focal distance increases in a direction of negative (−) number. In particular, in case where the magnification is 1.6 or more, magnification of the third lens G3 drastically increases in the direction of negative (−) number. In the eighth lens G8, with the increase of magnification in vertical direction, the focal distance increases in the direction of positive (+) number. In particular, in case where magnification is 1.6 or more, magnification of the eighth lens G8 drastically increases in the direction of positive (+) number.

It is assumed here that practical anamorphic magnification is 1.0 to 2.0 times. Between these magnification values, a focal distance in horizontal direction (fh) and a focal distance in vertical direction (fv) in each of the third lens G3 and the eighth lens G8 were calculated. Further, based on the results of this calculation, a focal distance ratio (fv/fh) was calculated.

Figure 17:
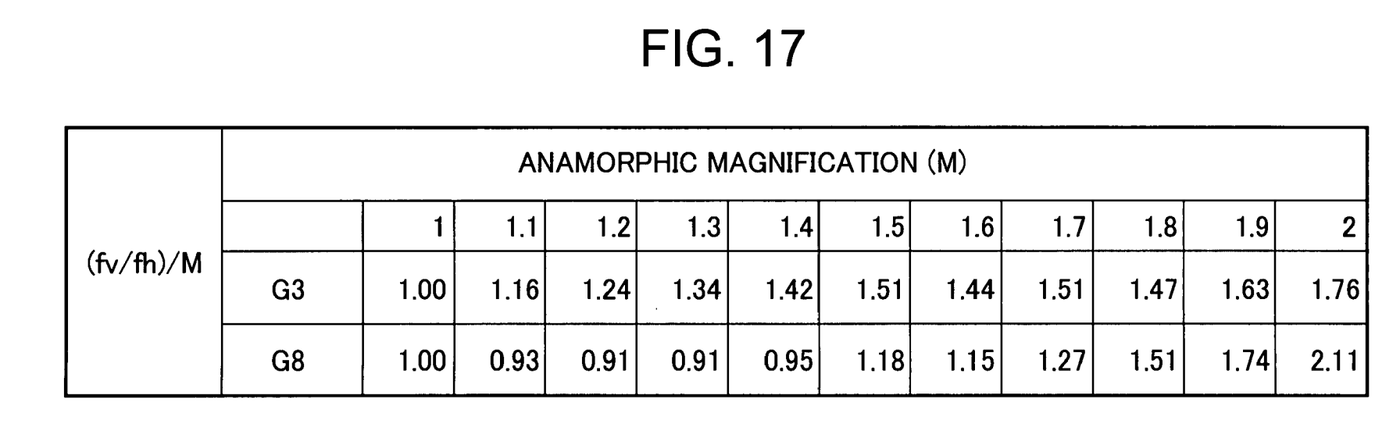
FIG. 17 is a table to show focal distance ratio (fv/fh) obtained by calculation of the third lens G3 and the eighth lens G8.
Figure 18:
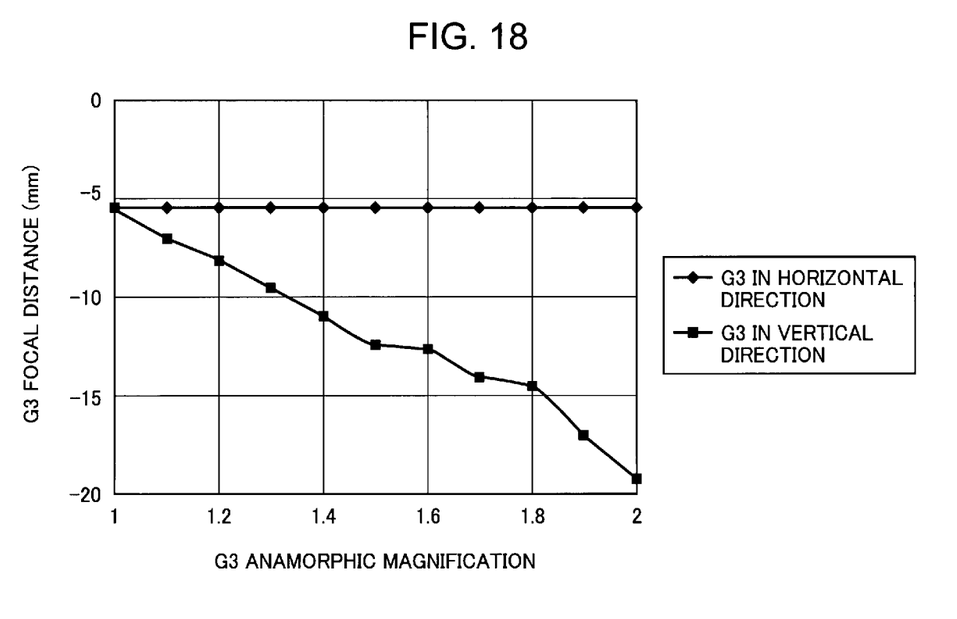
FIG. 18 is a graph to show each anamorphic magnification in horizontal direction and in vertical direction of the third lens G3.
Figure 19:
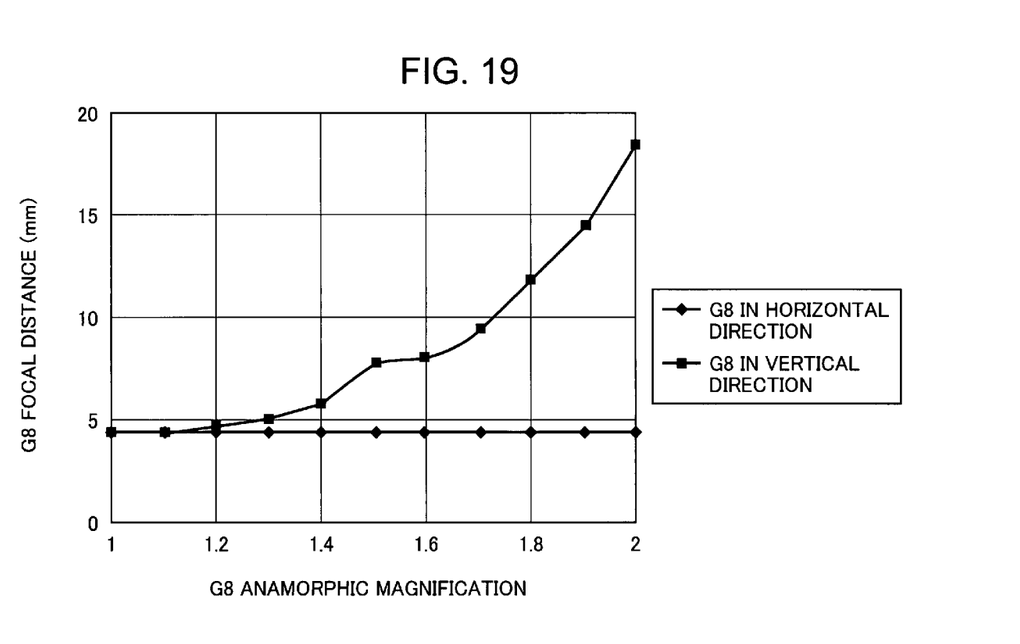
FIG. 19 is a graph to show each anamorphic magnification in horizontal direction and in vertical direction of the eighth lens G8.

FIG. 17 shows the focal distance ratio (fv/fh) obtained by the calculation. FIG. 18 shows the values of anamorphic magnification in each of horizontal direction and vertical direction of the third lens G3, and FIG. 19 shows the values of anamorphic magnification in each of horizontal direction and vertical direction of the eighth lens G8.

As described above, in the Japanese Patent Publication JP-A-2006-11093, the condition is: 0.3<|fpnx/fppx|<0.6, and 0.3<|fpny/fppy|<0.6. However, according to the present invention the condition is: |fpnx/fppx|=1.21, |fpny/fppy|=1.26. While maintaining the effective focal distance, temperature characteristics are balanced well as a whole. Also, the lens is so designed that the effective field angle can be obtained in horizontal direction. According to the present invention, the above relationship can be satisfied by the focal distances in horizontal direction and in vertical direction of G3 and G8 respectively.

As described above, curvatures are changed in each of horizontal direction and vertical direction. The focal distance ratio is adjusted, and an aspheric surface is attained to have high resolution in each direction and aspheric surface is accomplished in order to emphasize images in the surrounding. Also, projection characteristics are brought closer to the stereoscopic projection and in particular, the resolving power outside the axis is increased. As a result, it is possible to increase effective field angle to 200° or more at maximum in horizontal direction and to at least 220° at maximum and it is possible to accomplish an precise anamorphic magnification. Further, it is possible to realize an anamorphic optical system with high projection characteristics and high resolving power in particular and to accomplish an anamorphic magnification, which is not influenced by temperature conditions.

When the anamorphic optical system 1 of the present invention is applied to an image pickup device, to an on-board type camera for taking images inside or outside the vehicle, or to a monitoring camera for taking and recording images inside or outside the vehicle while a moving object such as an automobile is being driven or is parked, it is possible to provide an image pickup device and an on-board camera, which can attain an effective field angle of 200° at maximum, and at least about 220° at maximum, and can accomplish a precise anamorphic magnification and can have temperature characteristics to endure environmental changes.

The invention claimed is:

1. An anamorphic optical system, wherein a first lens G1, a second lens G2, a third lens G3, a fourth lens G4, a fifth lens G5, a diaphragm s11, a sixth lens G6, a seventh lens G7, an eighth lens G8, and a ninth lens G9 are arranged respectively from an object side,
wherein said first lens G1, said second lens G2, said third lens G3, said fourth lens G4, and said fifth lens G5 have lens surfaces s1 to s10 respectively from said object side and said sixth lens G6, said seventh lens G7, said eighth lens G8, and said ninth lens G9 have lens surfaces s12 to s19 respectively from said object side,
wherein said third lens G3, said fifth lens G5, said seventh lens G7 and said eighth lens G8 are comprised of plastic and said first lens G1, said second lens G2, said fourth lens G4, and said sixth lens G6 are comprised of glass and said ninth lens G9 is a glass plate, wherein said lens surface s9, said lens surface s10, said lens surface s14 and said lens surface s15 are aspheric surfaces, and said third lens G3 and said eighth lens G8 are anamorphic lenses,
and wherein a ratio of the focal distance in the vertical direction of said third lens G3 to the focal distance in the vertical direction of said eighth lens G8 is $1.05 \leq |fpnx/fppx| \leq 1.87$, wherein the optical axis is the Z-axis and the X-axis and the Y-axis perpendicularly cross said Z-axis,
and wherein fpnx is defined as an X-Z section paraxial focal distance of said third lens G3, which is a negative lens comprised of plastic,
and fppx is defined as an X-Z section paraxial focal distance of said eighth lens G8, which is a positive lens comprised of plastic, and wherein a X-Z section paraxial focal distance represents the focal distance in the vertical direction.

2. An image pickup device comprising the anamorphic optical system of claim 1.

3. An on-board type camera comprising the anamorphic optical system of claim 1.

4. A monitoring camera comprising the anamorphic optical system of claim 1.

* * * * *